United States Patent [19]

Isa et al.

[11] 4,154,810
[45] * May 15, 1979

[54] MANUFACTURE OF CHLORINE DIOXIDE BY REDUCTION OF A SPECIFIED CHLORATE

[75] Inventors: Isao Isa, Misato; Makoto Ebisawa, Kiryu; Morioki Shibuya, Shibukawa, all of Japan

[73] Assignee: The Japan Carlit Co., Ltd., Tokyo, Japan

[*] Notice: The portion of the term of this patent subsequent to Sep. 27, 1994, has been disclaimed.

[21] Appl. No.: 895,723

[22] Filed: Apr. 12, 1978

[30] Foreign Application Priority Data

Nov. 26, 1977 [JP] Japan ............................. 52/141954

[51] Int. Cl.$^2$ .............................................. C01B 11/02
[52] U.S. Cl. ................................................... 423/478
[58] Field of Search ............................. 423/478–480; 260/429 J, 429 R

[56] References Cited

U.S. PATENT DOCUMENTS

| 4,051,229 | 9/1977 | Isa et al. ............................... 423/478 |
| 4,075,308 | 2/1978 | Rapson et al. ........................ 423/478 |

FOREIGN PATENT DOCUMENTS

1157077 11/1963 Fed. Rep. of Germany ........... 260/429

OTHER PUBLICATIONS

Chaberek, *Organic Sequestering Agents*, John Wiley & Sons, N.Y., 1959, pp. 12, 378, 379.

*Primary Examiner*—Brian Hearn
*Attorney, Agent, or Firm*—Frishauf, Holtz, Goodman & Woodward

[57] ABSTRACT

Chlorine dioxide is generated very efficiently and safely by reducing a chlorate in a strong acid in the presence of a complex catalyst consisting of palladium(II) and an amino acid or an alkali metal salt thereof.

25 Claims, 4 Drawing Figures

MANUFACTURE OF CHLORINE DIOXIDE BY REDUCTION OF A SPECIFIED CHLORATE

FIELD OF THE INVENTION

This invention relates to a process for manufacturing chlorine dioxide by reducing a chlorate in a strong acid in the presence of a new catalyst.

DESCRIPTION OF PRIOR ART

Chlorine dioxide is a commercially important material in such fields as pulp bleaching, water treatment and fat decoloring, and also has recently been used in fields of denitration of industrial waste gases and removal of phenols from industrial sewage. Thus, it is highly desirable to have a process by which chlorine dioxide can be manufactured economically. Further, it is desirable to have a safe process in which the generation of chlorine dioxide can be easily controlled without any danger of explosion.

One of the methods for generating chlorine dioxide is to reduce a chlorate with a reducing agent in a strong acid. The reactions which occur are exemplified below, wherein, for the sake of illustration, the chlorate used is sodium chlorate and the reducing agent is hydrochloric acid.

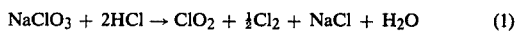

$$NaClO_3 + 2HCl \rightarrow ClO_2 + \tfrac{1}{2}Cl_2 + NaCl + H_2O \quad (1)$$

$$NaClO_3 + 6HCl \rightarrow 3Cl_2 + NaCl + 3H_2O \quad (2)$$

Chlorine dioxide is formed by reaction (1), but not by reaction (2).

Accordingly, reaction (1) must be accelerated in order to generate chlorine dioxide efficiently. A useful method to achieve this purpose is to use a catalyst which accelerates reaction (1) in preference to reaction (2).

Palladium was described in Japanese Patent Publication No. 2645/1970 as a catalyst for chlorine dioxide production. Vanadium pentoxide, silver ion, manganese ion, dichromate ion and arsenic ion were described in U.S. Pat. No. 3,563,702 for the same usage. Further, for the same purpose Japanese Patent Publication Nos. 4119/1960, 7301/1962, 14958/1964 and 17047/1966 disclose manganese compounds; silver ions or a combination of silver ion and manganese ion; manganese(II) chelate compounds along or a combination of manganese chelate compounds and metal sequestering agents; lead ion or a combination of lead ion, manganese ion and silver ion; respectively. It is well known in the field of this invention that the ratio of the rate of reaction (1) to that of reaction (2) decreases at lower values of the chlorate-to-reducing agent molar ratio and at lower acid concentrations of the reaction medium, although the generation of chlorine dioxide under such conditions can be controlled more easily. However, these catalysts do not have satisfactory activities under the conditions described above. Even with palladium which shows the highest activity among them, the ratio of the rate of reaction (1) to that of reaction (2) found under the following conditions scarcely exceeds the value of 17, an acid concentration of 0.4 moles per liter of the reaction medium, a chlorate-to-reducing agent molar ratio of 0.27 and a palladium(II) concentration of 0.001 mole per liter of the reaction medium.

Recently, a process for manufacturing chlorine dioxide at lower acid concentrations and at remarkably high concentrations of a reducing agent (e.g., British Pat. No. 1,347,740) has been developed. Under such reaction conditions, even more active catalysts are required in order to generate chlorine dioxide without loss of efficiency.

SUMMARY OF THE INVENTION

It is an object of the invention, therefore, to provide an excellent catalyst for efficiently manufacutring chlorine dioxide, said catalyst having a high catalytic activity even under the easily controllable conditions of low acid concentrations and low chlorate-to-reducing agent molar ratios of the reaction medium.

It is another object of this invention to provide a process for efficiently manufacturing chlorine dioxide by using an excellent catalyst which has a high catalytic activity even under the easily controllable conditions of low acid concentrations and low chlorate-to-reducing agent molar ratios of the reaction medium.

Other objects and advantage of the present invention may become apparent to those skilled in the art from the following description and disclosure.

DESCRIPTION OF THE PREFERRED EMBODIMENT

Figure 1:
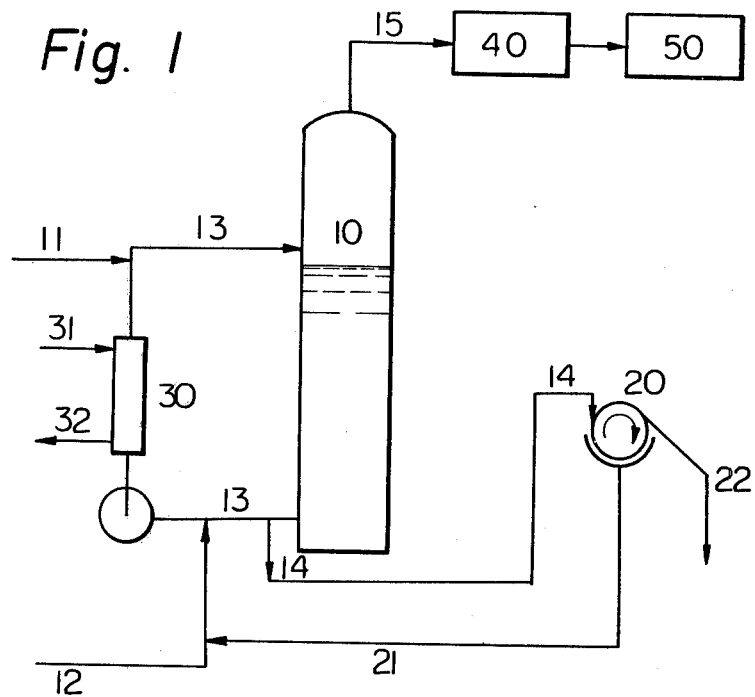
FIG. 1 and FIG. 2 are partial schematic and flow sheets of the present invention.

This invention relates to a process for manufacturing chlorine dioxide by reducing a chlorate in a strong acid in the presence of a complex catalyst consisting of palladium(II) and an amino acid or an alkali metal salt thereof.

The strong acid used in the process of this invention is generally selected from the group consisting of sulfuric acid, hydrochloric acid and a mixture thereof. The concentration of the sulfuric acid may be from 0.5 to 6 moles per liter of the reaction medium. The concentration of the hydrochloric acid may be from 0.01 to 4 moles per liter of the reaction medium. But if the concentration of sulfuric acid is below 0.5 or that of hydrochloric acid below 0.01 mole per liter, the rate of chlorine dioxide generation becomes too slow commercially. On the other hand, if the concentration of sulfuric acid exceeds 6 or that of hydrochloric acid 4 moles per liter, the rate of reaction becomes too fast to assure safety.

Said chlorate is generally selected from the group consisting of sodium chlorate, potassium chlorate, calcium chlorate and magnesium chlorate. The concentration of the chlorate may be from 0.01 to 5 moles per liter of the reaction medium. If it is below 0.01 mole per liter, the rate of chlorine dioxide generation becomes too slow commercially. On the other hand, if it exceeds 5 moles per liter of the reaction medium, it becomes too fast to assure safety in operation, and the loss of the expensive chlorate increases.

As said reducing agent, sulfur dioxide, methanol, sodium chloride, calcium chloride, potassium chloride or hydrochloric acid is commonly used.

Said complex catalyst consisting of palladium(II) and an amino acid or an alkali metal salt thereof is readily prepared by dissolving a palladium(II) salt and amino acid or alkali metal salt thereof in water. It can be obtained in a crystalline form by cooling the aqueous solution containing palladium(II) salt and an amino acid or an alkali metal salt thereof and by filtering.

Said amino acid includes glycine, alanine, valine, leucine, isoleucine, serine, threonine, cysteine, cystine, methionine, aspartic acid, glutamic acid, lysine, arginine, phenylalanine, tyrosine, histidine, tryptophan, proline, hydroxyproline, β-aminopropionic acid, γ-aminobutyric acid, anthranilic acid and the like.

The concentration of said complex catalyst may be from 0.00001 to 0.1 mole per liter of the reaction medium. If it is below 0.00001 mole per liter, the rate of chlorine dioxide generation is not accelerated by a measurable amount. On the other hand, when it is above 0.1 mole per liter of the reaction mixture, there is no particular advantage and the production cost becomes higher.

The preferred concentration of said complex catalyst is from 0.00005 to 0.005 mole per liter of the reaction medium.

Since sulfur is now commercially available at a reduced cost owing to the recently increasing introduction of desulfurization units into pulp mills, such sulfur compounds as sodium sulfate described as a byproduct of the processes of U.S. Pat. No. 2,863,722 (1958) and Japanese Pat. No. 15890/1968 or sulfuric acid and sodium sulfate commonly found in effluents of conventional chlorine dioxide plants are losing their commercial value.

The reactions involved in such process are exemplified below, wherein, for the sake of illustration, the chlorate used is sodium chlorate and the reducing agent is sodium chloride:

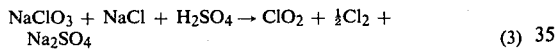

$$NaClO_3 + NaCl + H_2SO_4 \rightarrow ClO_2 + \tfrac{1}{2}Cl_2 + Na_2SO_4 \quad (3)$$

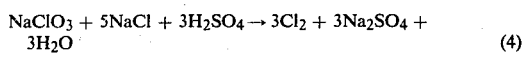

$$NaClO_3 + 5NaCl + 3H_2SO_4 \rightarrow 3Cl_2 + 3Na_2SO_4 + 3H_2O \quad (4)$$

In order to remove the disadvantage described above, a process comprising feeding an alkali metal chlorate and hydrochloric acid into a single generator-crystallizer, thereby depositing the corresponding alkali metal chloride instead of the undesirable byproduct sulfur compounds is described in Japanese Patent Publications (first) No. 15391/1972 and No. 151295/1976.

Such a process is preferable because it does not produce less valuable sulfur compounds and forms a completely closed system. However, the chlorate must be reduced in a reaction medium of lower acidity, if hydrochloric acid is to be used. On the other hand, if a single generator-crystallizer is used for reducing chlorate with hydrochloric acid, the molar ratio of chlorate to chloride in the reaction medium is considerably reduced, because the reaction medium is kept saturated with respect to the alkali metal chloride. It is well known that the efficiency of chlorine dioxide generation is reduced with decreasing activity or with decreasing molar ratio of chlorate to chloride in the reaction medium. Without any catalyst, the ratio of the rate of reaction (1), $R_1$, to that of reaction (2), $R_2$, was found to be only 2.3 under the conditions of a hydrochloric acid concentration of 0.2 mol/l, a sodium chlorate concentration of 1.0 mol/l and a sodium chloride concentration of 4.6 mol/l of the reaction medium. In other words, so long as a highly active catalyst is not used, it is practically impossible to manufacture chlorine dioxide economically.

If catalysts of this invention are used, the ratio of the rate of reaction (1), $R_1$, to that of reaction (2), $R_2$, is raised to as high as 80 under the otherwise same conditions. Silver ions have the highest activity among the catalysts described in Japanese Patent Publication (first) No. 15391/1972. However, silver ions coprecipitate with the solid alkali metal chloride that is deposited and are removed from the reaction medium. As a result, the silver ion concentration of the reaction medium is reduced considerably, the ratio of the rate of reaction (1), $R_1$, to that of reaction (2), $R_2$, is reduced and the efficiency of chlorine dioxide generation is also reduced. Thus, the silver ions can not be regarded as a useful catalyst for the hydrochloric process. Palladium ions as described by the present applicants in Japanese Patent Publication (first) No. 151295/1976 are more active than silver ions but their catalytic activity is not satisfactory and so more active catalysts have been desired.

The present invention is further described by way of an example with reference to FIG. 1 which is a flow sheet illustrating one embodiment of the invention.

Hydrochloric acid and chlorate is fed to a single generator-crystallizer 10 continuously through lines 11 and 12, respectively. A complex catalyst consisting of palladium(II) and an amino acid or an alkali metal salt thereof is fed to the single generator-crystallizer 10 through line 11, line 12 or any other line. The amount of said complex catalyst to be fed is equal to the amount of said complex catalyst removed together with solid alkali metal chloride produced in the single generator-crystallizer. The mixture of chlorine dioxide, chlorine and water vapor in the gas phase of the single generator-crystallizer is removed through line 15, then chlorine dioxide and chlorine are recovered with conventional equipment 40 for recovering chlorine dioxide and chlorine. The aqueous reaction medium is subjected to a reduced pressure and heated so that boiling takes place. The amount of water removed from the solution by boiling is adjusted to be equal to the net increase in the amount of water added to the system through the feeds as well as by the result of the reaction. The level of the reaction medium in the single generator-crystallizer can thus be maintained substantially constant. The water vapor serves to dilute the gaseous products and bring the chlorine dioxide content away from the explosion range, to expel said gaseous products from the solution surface, and to help said gaseous products disengage from inside the reaction medium. The loss of heat carried away by the water vapor is compensated by a heat exchanger 30 installed within a recirculating system through which the reaction medium is recirculated. As is mentioned above, the removal of water in accordance with this invention is effected under a reduced pressure, whereby the solution temperature is substantially determined by the pressure. The pressure employed in the present invention is 20 to 400 mmHg, whereby the temperature is kept as 25° to 90° C. If the pressure goes above 400 mmHg, then the temperature will exceed 90° C., resulting in the enhanced danger of explosion of chlorine dioxide. If a pressure below 20 mmHg is employed, the temperature of the system will go down below 25° C., resulting in excessively diminished rates of reaction, and the process will become uneconomical. The preferred range of pressure is 100 to 300 mmHg, thereby bringing the temperature to between 50° and 85° C.

The composition of the reaction medium in the single generator-crystallizer is described below. The alkali metal chlorate should be present in the reaction medium in a concentration of 0.2 to 5 mol/l or preferably 0.5 to 3 mol/l. If the chlorate concentration lies below 0.2 mol/l, the rate of generation of chlorine dioxide becomes excessively low, and it also comes to be difficult to control the chlorate concentration itself. On the other hand, if the chlorate concentration goes above 5 mol/l, the amount of chlorate lost in that portion of the reaction medium that sticks to the deposited alkali metal chloride which is withdrawn from the system by means of a solid-liquid separator increases, thus adversely affecting the yield of chlorine dioxide with respect to the alkali metal chlorate fed to the system. Hydrochloric acid should be present in the reaction medium at a concentration of 0.01 to 2 mol/l or preferably 0.02 to 1 mol/l. At acidities below 0.01 mol/l, the rate of reaction (1) is too diminished to be economical, whereas at acidities higher than 2 mol/l, the reaction proceeds too rapidly to be conducted safely, and the rate of crystallization of alkali metal chloride becomes excessively high, resulting in finer crystals and consequently causing difficulty in operation. The reaction medium is kept saturated with respect to the alkali metal chloride corresponding to the alkali metal chlorate because the alkali metal chloride is crystallized in the single generator-crystallizer by the process of this invention.

The solid alkali metal chloride formed in the course of reaction within the single generator-crystallizer is continuously withdrawn therefrom as a slurry through line 14 and separated in a solid-liquid separator 20 and the solid alkali metal chloride is discharged through line 22. On the other hand, the mother liquor is returned to the single generator-crystallizer.

The solid alkali metal chloride thus separated can be electrolytically converted to the corresponding chlorate and again used for manufacturing chlorine dioxide.

If the process for generating chlorine dioxide in accordance with this invention is combined with a process in which alkali metal chloride is electrolytically converted to the corresponding chlorate, chlorine dioxide can be manufactured more efficiently and economically.

Figure 2:
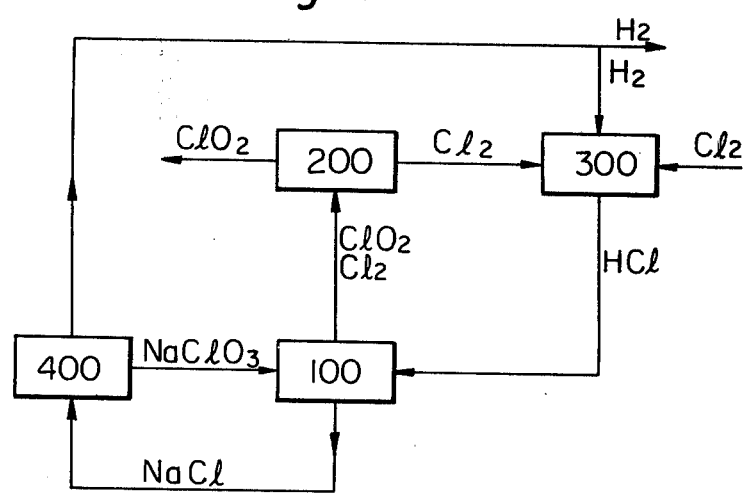

The present invention is further described by way of an example with reference to FIG. 2 which is a flow sheet illustrating another embodiment of the invention.

Chlorine dioxide and chlorine produced in a chlorine dioxide generator 100 by reaction (1) and (2) are separated in a separator 200. Chlorine dioxide is used as a reagent for bleaching pulp, whereas chlorine is fed into a hydrochloric acid reactor 300, then is reacted therein with a part of the hydrogen produced in a chlorate cell 400, and is converted into gaseous hydrogen chloride or hydrochloric acid, which in turn is fed into the chlorine dioxide generator 100. The alkali metal chloride produced in the chlorine dioxide generator 100 is fed to the chlorate cell 400 and converted to the corresponding alkali metal chlorate, which is then fed into the chlorine dioxide generator 100.

The over-all reaction of the process described above is as follows:

$$\tfrac{1}{2}Cl_2 + 2H_2O \rightarrow ClO_2 + 2H_2 \quad (5)$$

Since it is shown by reaction (5) that chlorine dioxide and hydrogen are produced from chlorine and water, it is now possible to manufacture chlorine dioxide from inexpensive reactants.

The complex catalyst of the present invention consisting of palladium(II) and amino acid or alkali metal salt thereof accelerates the rate of reaction (1), but does not accelerate that of reaction (2). Accordingly, the catalyst increases the conversion from the chlorate to chlorine dioxide remarkably. The ratio of the rate of reaction (1) to that of reaction (2) in hydrochloric acid was found to be less than 30 with any one of the conventional catalysts mentioned above, whereas a value of as high as 100 was obtained with a complex catalyst of this invention.

Advantages obtained with the present invention are as follows:

The rate of reaction (1) is remarkably accelerated by adding a complex catalyst of this invention to the reaction medium even at low acid concentrations or low chlorate-to-reducing agent molar ratios. Accordingly, the volume of the reaction vessel required for generating chlorine dioxide at a given rate can be reduced remarkably from those most frequency used in the prior art. The concentrations of the chlorate and the strong acid in the reaction medium can also be reduced. As a result, the generation of chlorine dioxide is controlled more easily and becomes more efficient. Furthermore, abnormal generation or explosion of chlorine dioxide can be avoided, since lower reaction temperatures can be used.

Furthermore, the complex catalyst of this invention can be readily fed into the chlorine dioxide generator, since it is soluble in water.

While the complex catalyst of this invention has a remarkable catalytic activity by itself, it can also be used in conjunction with conventional catalysts, resulting in further increased activity. As such conventional catalysts, palladium ion, vanadium pentoxide, silver ion, manganese ion, dichromate ion, arsenic ion, lead ion and thallium ion are used.

The following examples are given to further illustrate this invention, but it should be understood that the invention is by no means limited thereto. On the contrary, they are given only to clarify some of the essential working modes of the present invention.

EXAMPLE 1

Figure 3:
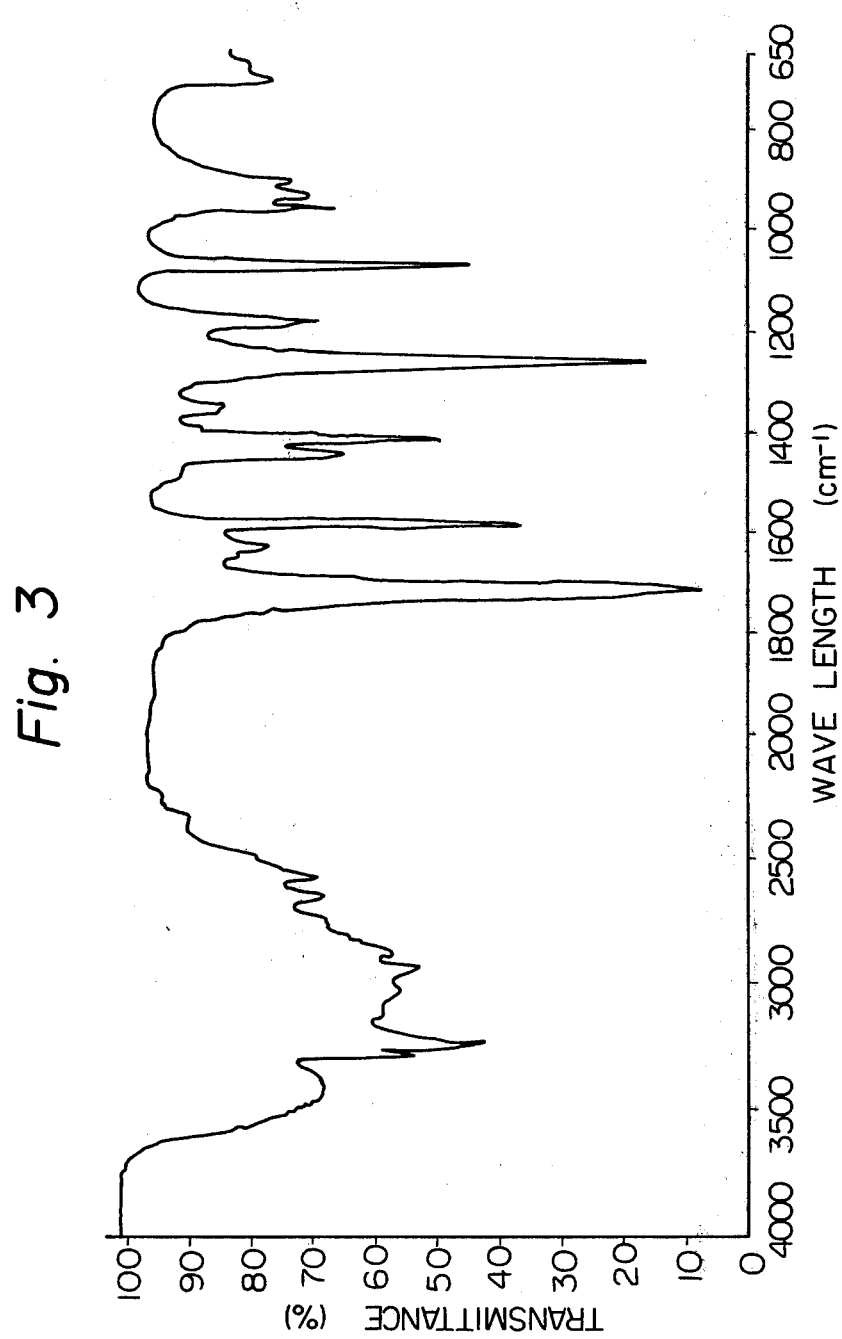
FIG. 3 and FIG. 4 show the infrared spectra of a complex catalyst consisting of palladium(II) and glycine and glycine itself, respectively.
Figure 4:
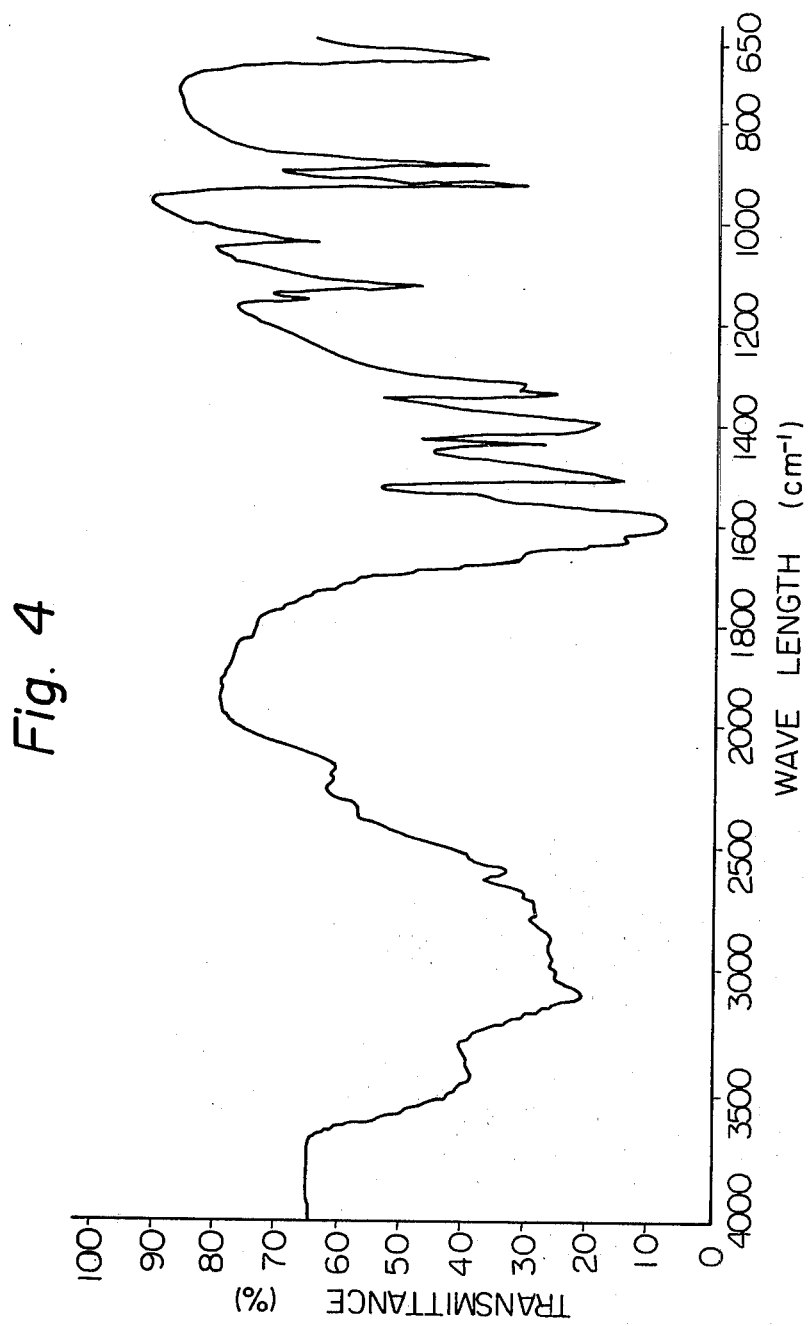

One hundred and fifty ml of an aqueous solution containing 3.42 mol/l NaCl and 1.88 mol/l NaClO$_3$ was charged in a four-necked 500 ml flask and the solution was kept at 30° C. One hundred and fifty ml of another aqueous solution containing 0.8 mol/l HCl, 3.42 mol/l NaCl and a complex catalyst consisting of 1 mole of palladium(II) and 2 moles of glycine (a yellow crystal, melting point 186° C., infrared spectrum shown in FIG. 3) were heated up to 30° C. and was added to the first solution. Thus, chlorine dioxide was generated. The composition of the reaction medium was 0.4 mol/l HCl, 0.94 mol/l NaClO$_3$, 3.42 mol/l NaCl and 0.01 mol/l complex catalyst. The reaction medium was agitated by introducing air thereto at about 500 ml/min and then the reaction medium and gas phase were analyzed every 5 minutes. The ratio of the rate of reaction (1) to that of reaction (2) was 99.

Reference Example 1

The procedure described in Example 1 was repeated except that PdCl$_2$ was used as the catalyst.

The ratio of the rate of reaction (1) to that of reaction (2) was 30 both at 0.01 and 0.02 mol/l PdCl$_2$.

Reference Example 2

The experiment of Example 1 was repeated but without any catalyst. The ratio of the rate of reaction (1) to that of reaction (2) was found to be 2.

EXAMPLES 2-5

The experiment of Example 1 was repeated except that the concentration of the complex catalyst was varied.

The results obtained are given in Table 1.

Table 1

| Example | Concentration of complex catalyst consisting of 1 mole Pd(II) and 2 mole glycine (mol/l) | Ratio of the rate of reaction (1) to that of reaction (2) $R_1/R_2$ |
|---|---|---|
| 2 | 0.005 | 80 |
| 3 | 0.001 | 35 |
| 4 | 0.0005 | 24 |
| 5 | 0.0001 | 15 |

EXAMPLE 6

Two and one-half liters of an aqueous solution containing 3.0 mol/l sodium chlorate, 3.6 mol/l sodium chloride and 0.001 mol/l complex catalyst consisting of 1 mole palladium(II) and 2 moles glycine was put in a single generator-crystallizer of 3 liters and water was continuously withdrawn therefrom at a rate of about 3 ml/min, under a reduced pressure of 200 mmHg at a temperature of 75° C. Twelve mol/l hydrochloric acid and 6.5 mol/l sodium chlorate were continuously fed to the single generator-crystallizer to maintain the volume and composition of the reaction medium substantially constant. Samples were taken every 30 minutes to analyze the gaseous mixture and the reaction medium. The mean composition of the reaction medium was found to be 0.2 mol/l in hydrochloric acid, 2.8 mol/l in sodium chlorate and 3.7 mol/l in sodium chloride. The ratio of the rate of reaction (1) to that of reaction (2) was found to be 66. Although the sodium chloride began to crystallize after 3 hours of reaction, no decrease in reaction efficiency and no change in the concentration of the complex catalyst were observed.

EXAMPLES 7-11

The experiment of Example 6 was repeated except that the complex catalyst was changed.

The results obtained are given in Table 2 below.

Table 2

| Examples | Complex catalyst | Concentration of complex catalyst (mol/l) | Ratio of the rate of reaction (1) to that of reaction (2) $(R_1/R_2)$ |
|---|---|---|---|
| 7 | Pd(II)-Leucine complex | 0.0001 | 68 |
| 8 | Pd(11)-Cysteine complex | 0.001 | 60 |
| 9 | Pd(II)-Aspartic acid complex | 0.001 | 70 |
| 10 | Pd(II)-Glutamic acid complex | 0.001 | 63 |
| 11 | Pd(11)-Arginine complex | 0.001 | 71 |

Reference Example 3

The experiment of Example 6 was repeated except that palladium(II) alone was used.

The ratio of the rate of reaction (1) to that of reaction (2) was found to be 35.

Reference Example 4

The experiment of Example 6 was repeated but without any catalyst.

The ratio of the rate of reaction (1) to that of reaction (2) was found to be 6.5.

EXAMPLE 12

Two and one-half liters of an aqueous solution containing 1.0 mol/l sodium chlorate, 1.4 mol/l sodium sulfate and 0.0001 mol/l complex catalyst consisting of 1 mole Pd(II) and 2 moles glycine was put in a single generator-crystallizer of 3 liters and water continuously withdrawn therefrom at a rate of about 3 g/min under a reduced pressure of 190 mmHg at a temperature of 70° C. An aqueous solution containing 3 mol/l sodium chlorate and 3.1 mol/l sodium chloride and 50 wt% sulfuric acid were continuously fed into the single generator-crystallizer to maintain the volume and the composition of the reaction medium substantially constant. Samples were taken every 30 minutes to analyze the gaseous mixture and the reaction medium. The mean composition of the reaction medium was found to be 0.94 mol/l sodium chlorate, 0.85 mol/l sodium chloride and 2.0 mol/l sulfuric acid. The ratio of the rate of reaction (3) to that of reaction (4) was found to be 97.

Reference Example 5

The experiment of Example 12 was repeated but without any catalyst.

The ratio of the rate of reaction (3) to that of reaction (4) was found to be 3.7.

What is claimed is:

1. A process for manufacturing chlorine dioxide by reducing a chlorate selected from the group consisting of sodium chlorate, potassium chlorate, calcium chlorate and magnesium chlorate, in a strong acid selected from the group consisting of sulfuric acid, hydrochloric acid and a mixture thereof, said sulfuric acid and hydrochloric acid each being present in a concentration of from about 0.5 to about 6 moles per liter and of from 0.01 to about 4 moles per liter of reaction medium, in the presence of a complex catalyst consisting of palladium-(II) and an amino acid or an alkali metal salt thereof.

2. The process of claim 1 in which said amino acid is glycine.

3. The process of claim 1 in which said amino acid is leucine.

4. The process of claim 1 in which said amino acid is cysteine.

5. The process of claim 1 in which said amino acid is aspartic acid.

6. The process of claim 1 in which said amino acid is glutamic acid.

7. The process of claim 1 in which said amino acid is arginine.

8. The process of claim 1 in which said complex catalyst is present in a concentration of from about 0.00001 to about 0.1 mole per liter of the reaction medium.

9. The process of claim 1 in which said complex catalyst is present in a concentration of from about 0.00005 to about 0.005 moles per liter of the reaction medium.

10. The process of claim 1, wherein the chlorate is reduced with a reducing agent selected from the group consisting of sulfur dioxide, methanol, sodium chloride, calcium chloride, potassium chloride and hydrochloric acid.

11. A process for manufacturing chloride dioxide, chlorine and an alkali metal chloride by the reaction of the corresponding alkali metal chlorate and hydrochloric acid in a single generator-crystallizer, comprising a step of reacting an aqueous reaction medium containing (a) hydrochloric acid at an acidity of 0.01 to 2 mol/l, (b) an alkali metal chlorate at a concentration of 0.2 to 5 mol/l, (c) chloride ion at a saturated concentration in said reaction medium and (d) a complex catalyst consisting of palladium(II) and an amino acid or an alkali metal salt thereof at a temperature of 25° to 90° C. under a reduced pressure of 20 to 400 mmHg, a step of evaporating water from said reaction medium, thereby depositing a solid alkali metal chloride therefrom, a step of withdrawing a gaseous mixture consisting of chlorine dioxide, chlorine and water vapor, and a step of recovering said solid alkali metal chloride.

12. The process of claim 11 in which said alkali metal chlorate is sodium chlorate and said alkali metal chloride is sodium chloride.

13. The process of claim 11 in which said amino acid is glycine.

14. The process of claim 11 in which said amino acid is leucine.

15. The process of claim 11 in which said amino acid is cysteine.

16. The process of claim 11 in which said amino acid is aspartic acid.

17. The process of claim 11 in which said amino acid is glutamic acid.

18. The process of calim 11 in which said amino acid is arginine.

19. The process of claim 11 in which said complex catalyst is present in a concentration of from about 0.00001 to about 0.1 mole per liter of the reaction medium.

20. The process of claim 11 in which said complex catalyst is present in a concentration of from about 0.00005 to about 0.005 mole per liter of the reaction medium.

21. The process of claim 11 in which said alkali metal chlorate is present in a concentration of from about 0.5 to about 3 moles per liter in the reaction medium.

22. The process of claim 11 in which said hydrochloric acid is present in a concentration of from about 0.02 to about 1 mole per liter of the reaction medium.

23. The process of claim 11 which is conducted at a temperature of 50° to 85° C. under a reduced pressure of 100 to 300 mmHg.

24. A process for manufacturing chlorine dioxide which includes a step of forming chlorine dioxide, chlorine and sodium chloride by reducing sodium chlorate with hydrochloric acid in the presence of a complex catalyst consisting of palladium(II) and an amino acid or an alkali metal salt thereof in a reaction medium, a step of converting said sodium chloride to sodium chlorate and hydrogen, a step of forming hydrogen chloride or hydrochloric acid by reacting said chlorine and a part of said hydrogen and a step of providing said sodium chlorate and said hydrogen chloride or said hydrochloric acid for generating chlorine dioxide.

25. The process of claim 24 which is conducted in a single generator-crystallizer.

* * * * *